US012783176B2

(12) United States Patent
Liu

(10) Patent No.: US 12,783,176 B2
(45) Date of Patent: Nov. 3, 2026

(54) ELECTRONIC DEVICE AND METHOD OF OPERATING SAME

(71) Applicant: REALTEK SEMICONDUCTOR CORPORATION, Hsinchu (TW)

(72) Inventor: Chih-Hao Liu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 77 days.

(21) Appl. No.: 19/176,486

(22) Filed: Apr. 11, 2025

(65) Prior Publication Data

US 2025/0370659 A1 Dec. 4, 2025

(30) Foreign Application Priority Data

Aug. 1, 2024 (TW) ................................ 113128839

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0604; G06F 3/0659; G06F 3/0673
USPC .......................................... 711/154, 100, 158
See application file for complete search history.

(56) References Cited

U.S. PATENT DOCUMENTS 9,798,548 B2 10/2017 Choquette et al.
10,445,010 B2 * 10/2019 Jeong .................... G06F 3/0616

FOREIGN PATENT DOCUMENTS

TW 201342212 A 10/2013

OTHER PUBLICATIONS

OA letter of a counterpart TW application (appl. no. 113128839) mailed on Feb. 25, 2026.

* cited by examiner

*Primary Examiner* — Mark A Giardino, Jr.
*Assistant Examiner* — Edward Waddy, Jr.
(74) *Attorney, Agent, or Firm* — WPAT, PC

(57) ABSTRACT

An electronic device includes a first functional circuit, a second functional circuit, a memory, and a clock asynchronous processor. The first functional circuit operates at a first clock and generates a read command. The second functional circuit operates at a second clock. The memory is coupled to the first functional circuit and the second functional circuit. The clock asynchronous processor is coupled to the first functional circuit and the memory and configured to check, according to the first clock and the second clock, whether the read command exists. When the read command exists, the clock asynchronous processor provides the read command to the memory.

20 Claims, 5 Drawing Sheets

ELECTRONIC DEVICE AND METHOD OF OPERATING SAME

BACKGROUND OF THE INVENTION

1. Field of the Invention

The present invention generally relates to an electronic device, and more particularly, to data transmission within the electronic device.

2. Description of Related Art

Reference is made to FIG. 1, which is a functional block diagram of a conventional electronic device. The electronic device 100 includes a functional circuit 110, a functional circuit 120, a dual-ported static random access memory (SRAM) 130, and a dual-ported SRAM 140. The dual-ported SRAM 130 and the dual-ported SRAM 140 are coupled between the functional circuit 110 and the functional circuit 120. The dual-ported SRAM 130 provides data transmission from the functional circuit 120 to the functional circuit 110. The dual-ported SRAM 140 provides data transmission from the functional circuit 110 to the functional circuit 120.

The functional circuit 110 operates at the clock CLK1, and the functional circuit 120 operates at the clock CLK2. The frequency of the clock CLK1 is not equal to the frequency of the clock CLK2. The advantage of the dual-ported SRAM 130 and the dual-ported SRAM 140 is that a reading operation and a writing operation can be performed at different frequencies. However, the dual-ported SRAM has disadvantages such as a large area and high cost.

SUMMARY OF THE INVENTION

In view of the issues of the prior art, an object of the present invention is to provide an electronic device and an operation method thereof, so as to make an improvement to the prior art.

According to one aspect of the present invention, an electronic device is provided. The electronic device includes: a first functional circuit operating at a first clock and generating a read command; a second functional circuit operating at a second clock; a memory coupled to the first functional circuit and the second functional circuit; and a clock asynchronous processor coupled to the first functional circuit and the memory and configured to check, according to the first clock and the second clock, whether the read command exists. When the read command exists, the clock asynchronous processor provides the read command to the memory.

According to another aspect of the present invention, an electronic device is provided. The electronic device includes: a first functional circuit operating at a first clock and generating a write command; a second functional circuit, operating at a second clock; a memory coupled to the first functional circuit and the second functional circuit; and a clock asynchronous processor coupled to the first functional circuit and the memory and configured to check, according to the first clock and the second clock, whether the write command exists. When the write command exists, the clock asynchronous processor provides the write command to the memory.

According to still another aspect of the present invention, a method of operating an electronic device is provided. The method includes the following steps: providing a first functional circuit and operating the first functional circuit at a first clock; providing a second functional circuit and operating the second functional circuit at a second clock; providing a memory, wherein the read priority of the memory is higher than the write priority; checking whether there is a read command or write command to be processed according to the first clock and the second clock; and providing the read command or the write command to the memory when the read command or the write command exists.

The technical means embodied in the embodiments of the present invention can solve at least one of the problems of the prior art. Therefore, compared to the prior art, the present invention can reduce the circuit area and lower the cost.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes an electronic device and a method of operating the electronic device. On account of that some or all elements of the electronic device could be known, the detail of such elements is omitted provided that such detail has little to do with the features of this disclosure, and that this omission nowhere dissatisfies the specification and enablement requirements. Some or all of the processes of the method of operating the electronic device can be performed by the electronic device or its equivalent. A person having ordinary skill in the art can choose components or steps equivalent to those described in this specification to carry out the present invention, which means that the scope of this invention is not limited to the embodiments in the specification.

Figure 1:
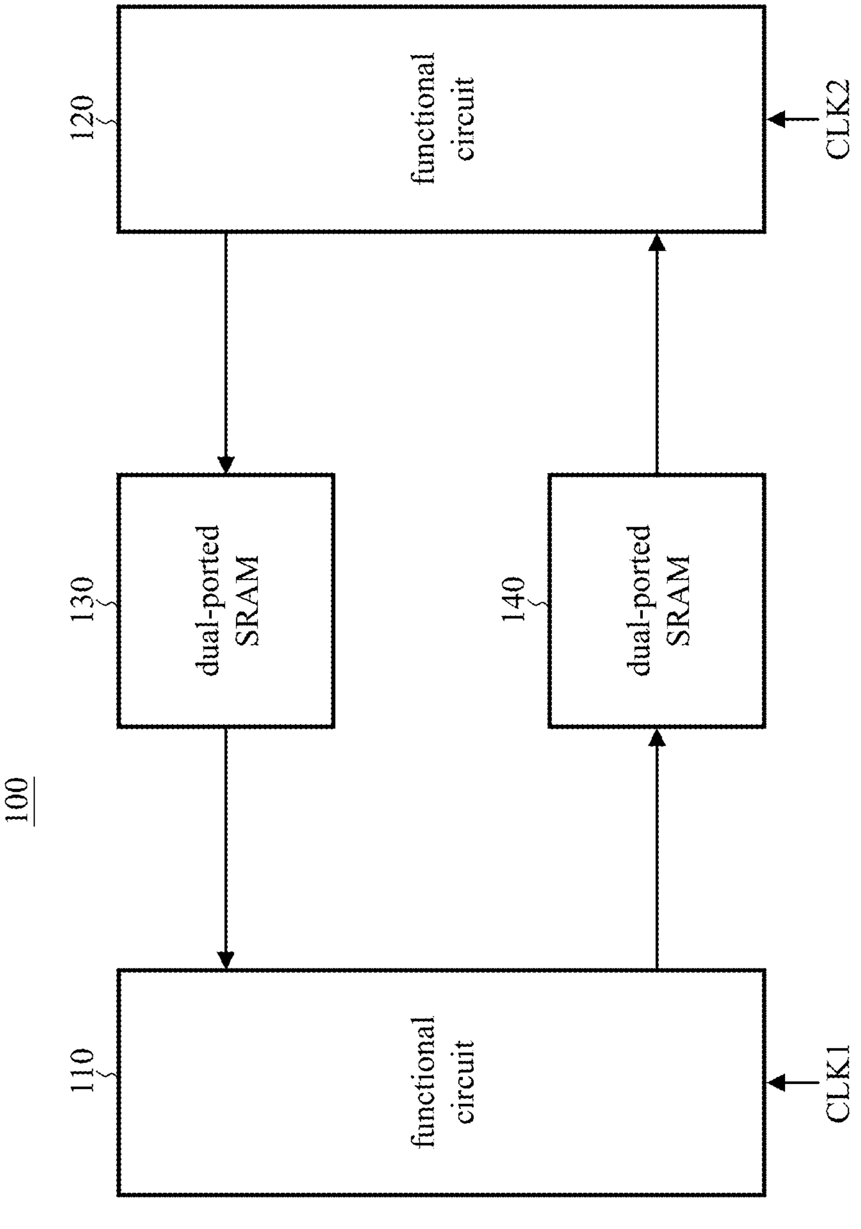
FIG. 1 (prior art)
FIG. 1 is a functional block diagram of a conventional electronic device.
Figure 2:
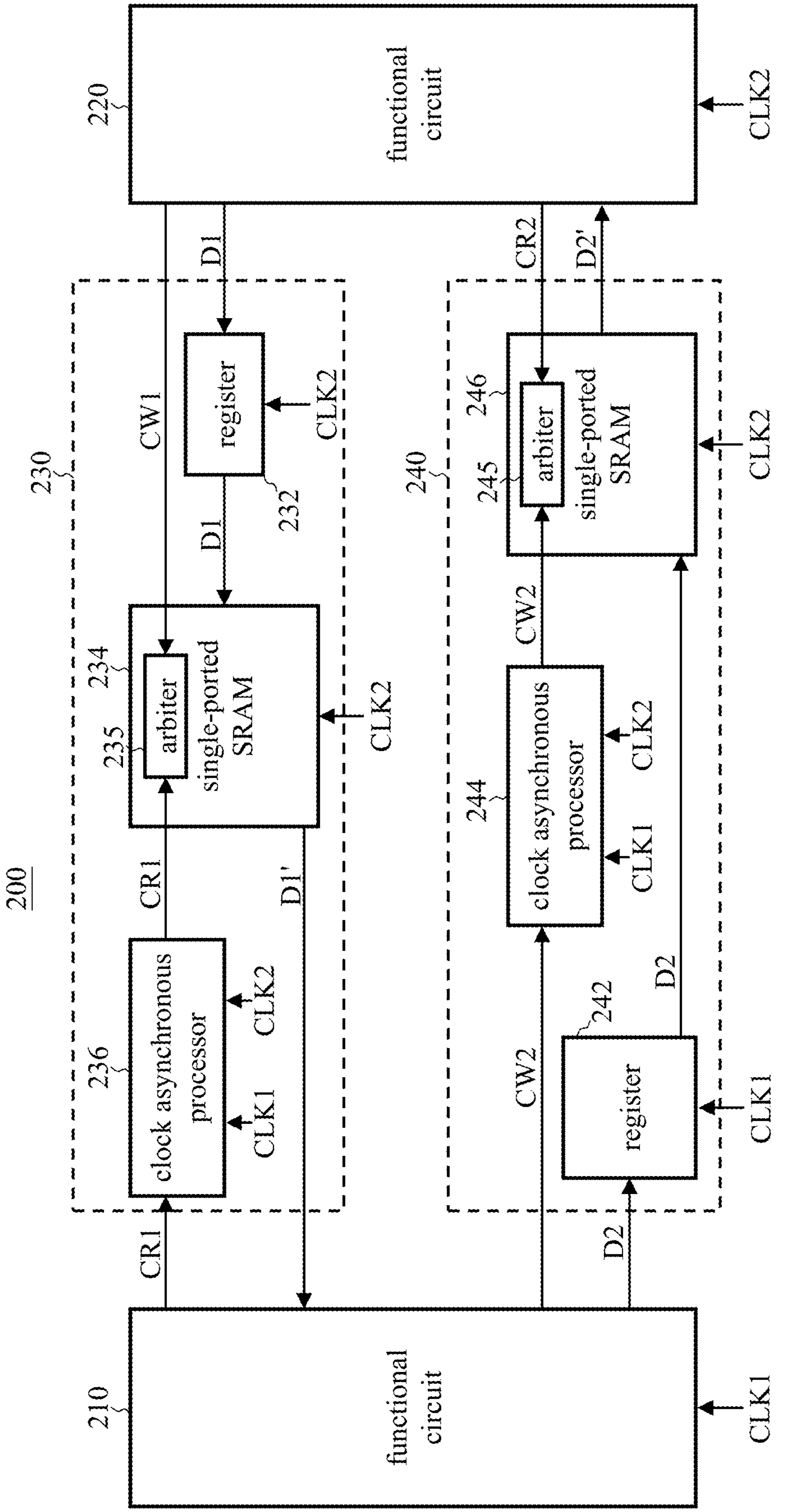
FIG. 2 is the functional block diagram of the electronic device according to an embodiment of the present invention.

Reference is made to FIG. 2, which is a functional block diagram of the electronic device according to an embodiment of the present invention. The electronic device 200 includes a functional circuit 210, a functional circuit 220, a data transmission path 230, and a data transmission path 240. The data transmission path 230 provides data transmission from the functional circuit 220 to the functional circuit 210 and includes a register 232, a single-ported SRAM 234, and a clock asynchronous processor 236. The data transmission path 240 provides data transmission from the functional circuit 210 to the functional circuit 220 and includes a register 242, a clock asynchronous processor 244, and a single-ported SRAM 246.

In some embodiments, the functional circuit 210 is an interface circuit, and the functional circuit 220 is a processor.

In some embodiments, the register 232 and the register 242 can be implemented using a first-in first-out (FIFO) register.

The functional circuit 210 operates at the clock CLK1, and the functional circuit 220 operates at the clock CLK2. The single-ported SRAM 234 and the single-ported SRAM 246 both operate at the clock CLK2 and includes an arbiter 235 and an arbiter 245, respectively. The frequency of the clock CLK1 is less than the frequency of the clock CLK2. In some embodiments, the frequency (f2) of the clock CLK2 is more than 4 times the frequency (f1) of the clock CLK1 (i.e., $f2 \geq 4f1$).

For the single-ported SRAM 234 and the single-ported SRAM 246, the read priority is higher than the write priority. More specifically, when the arbiter 235 simultaneously receives a read command CR1 and a write command CW1, the arbiter 235 first processes the read command CR1. Similarly, when the arbiter 245 simultaneously receives a read command CR2 and a write command CW2, the arbiter 235 first processes the read command CR2.

The register 232, which operates at the clock CLK2, is used to temporarily store the data D1. The register 242, which operates at the clock CLK1, is used to temporarily store the data D2. The depth (size) of the register 232 is related to the burst length of the write command CW1. The depth of the register 242 is related to the burst length of the write command CW2. The longer the burst length of the write command CW1 (the write command CW2), the deeper the depth of the register 232 (the register 242). The depths of the register 232 and the register 242 can be determined based on the actual operating conditions of the electronic device 200.

The clock asynchronous processor 236 and the clock asynchronous processor 244 are used to handle the clock asynchrony between the functional circuit 210 and the functional circuit 220. The clock asynchronous processor 236 is arranged between the functional circuit 210 and the single-ported SRAM 234, while the clock asynchronous processor 244 is arranged between the functional circuit 210 and the single-ported SRAM 246. The clock asynchronous processor 236 (the clock asynchronous processor 244) checks whether the functional circuit 210 issues the read command CR1 (the write command CW2) according to the clock CLK1 and the clock CLK2. The clock asynchronous processor 236 and the clock asynchronous processor 244 will be discussed in detail below in connection with FIG. 3.

For the functional circuit 220 (the functional circuit 210), when it is necessary to transmit the data D1 (the data D2), the functional circuit 220 (the functional circuit 210) issues the write command CW1 (the write command CW2), and writes the data D1 (the data D2) into the register 232 (the register 242).

For the functional circuit 210 (the functional circuit 220), when it is necessary to read the data D1' (the data D2') from the single-ported SRAM 234 (the single-ported SRAM 246), the functional circuit 210 (the functional circuit 220) sends the read command CR1 (the read command CR2) to the single-ported SRAM 234 (the single-ported SRAM 246). The arbiter 235 (the arbiter 245) of the single-ported SRAM 234 (the single-ported SRAM 246) immediately processes the read request after receiving the read command CR1 (the read command CR2). More specifically, even if there is a write command to be processed (e.g., the write command CW1 (the write command CW2)), the arbiter 235 (the arbiter 245) prioritizes processing the read command CR1 (the read command CR2) upon receiving the read command CR1 (the read command CR2), in order to immediately output the data D1' (the data D2') to the functional circuit 210 (the functional circuit 220).

The arbiter 235 (the arbiter 245) determines when the data D1 (the data D2) in the register 232 (the register 242) is written into the single-ported SRAM 234 (the single-ported SRAM 246). More specifically, the arbiter 235 (the arbiter 245) writes the data D1 (the data D2) into the single-ported SRAM 234 (the single-ported SRAM 246) when there is no read command to be processed (e.g., when the read command CR1 (the read command CR2) has been processed).

Figure 3:
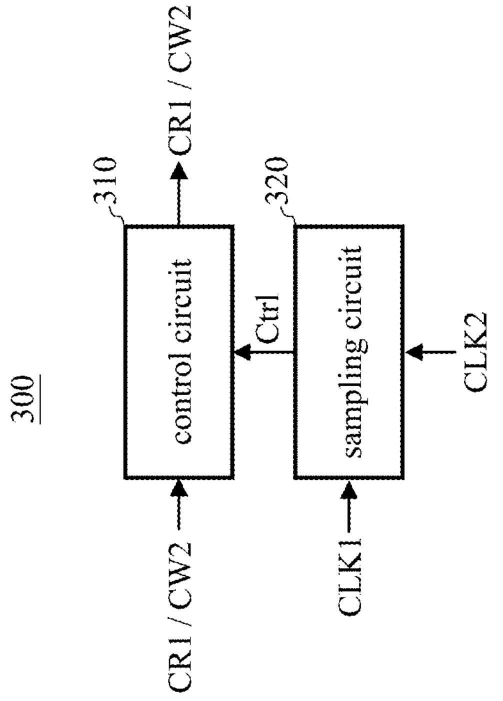
FIG. 3 is a functional block diagram of a clock asynchronous processor according to an embodiment of the present invention.

Reference is made to FIG. 3, which is a functional block diagram of the clock asynchronous processor according to an embodiment of the present invention. The clock asynchronous processor 300 includes a control circuit 310 and a sampling circuit 320 that are coupled to each other. The clock asynchronous processor 236 and the clock asynchronous processor 244 can be implemented using the clock asynchronous processor 300.

The sampling circuit 320 samples the clock CLK1 according to the clock CLK2. When sampling at the rising edge and/or falling edge of the clock CLK1, the sampling circuit 320 sends a control signal Ctrl to the control circuit 310. According to the control signal Ctrl, the control circuit 310 checks whether there is currently a read command (e.g., the read command CR1) or a write command (e.g., the write command CW2). On the condition that there is a read command or a write command to be processed when the control circuit 310 receives the control signal Ctrl, the control circuit 310 outputs the read command or the write command to the arbiter.

In summary, regardless of whether it is the data transmission path 230 or the data transmission path 240, by setting the clock asynchronous processor (236 or 244), the read and write operations of the single-ported SRAM can be performed at different frequencies, which means the effect of the dual-ported SRAM can be achieved. However, compared to the dual-ported SRAM, the single-ported SRAM has advantages such as a smaller area (approximately ⅔ of the dual-ported SRAM) and lower cost, making the electronic device 200 of the present invention more competitive.

It should be noted that in certain situations, if only unidirectional communication is required between the functional circuit 210 and the functional circuit 220, the electronic device 200 implements either the data transmission path 230 or the data transmission path 240.

Figure 4:
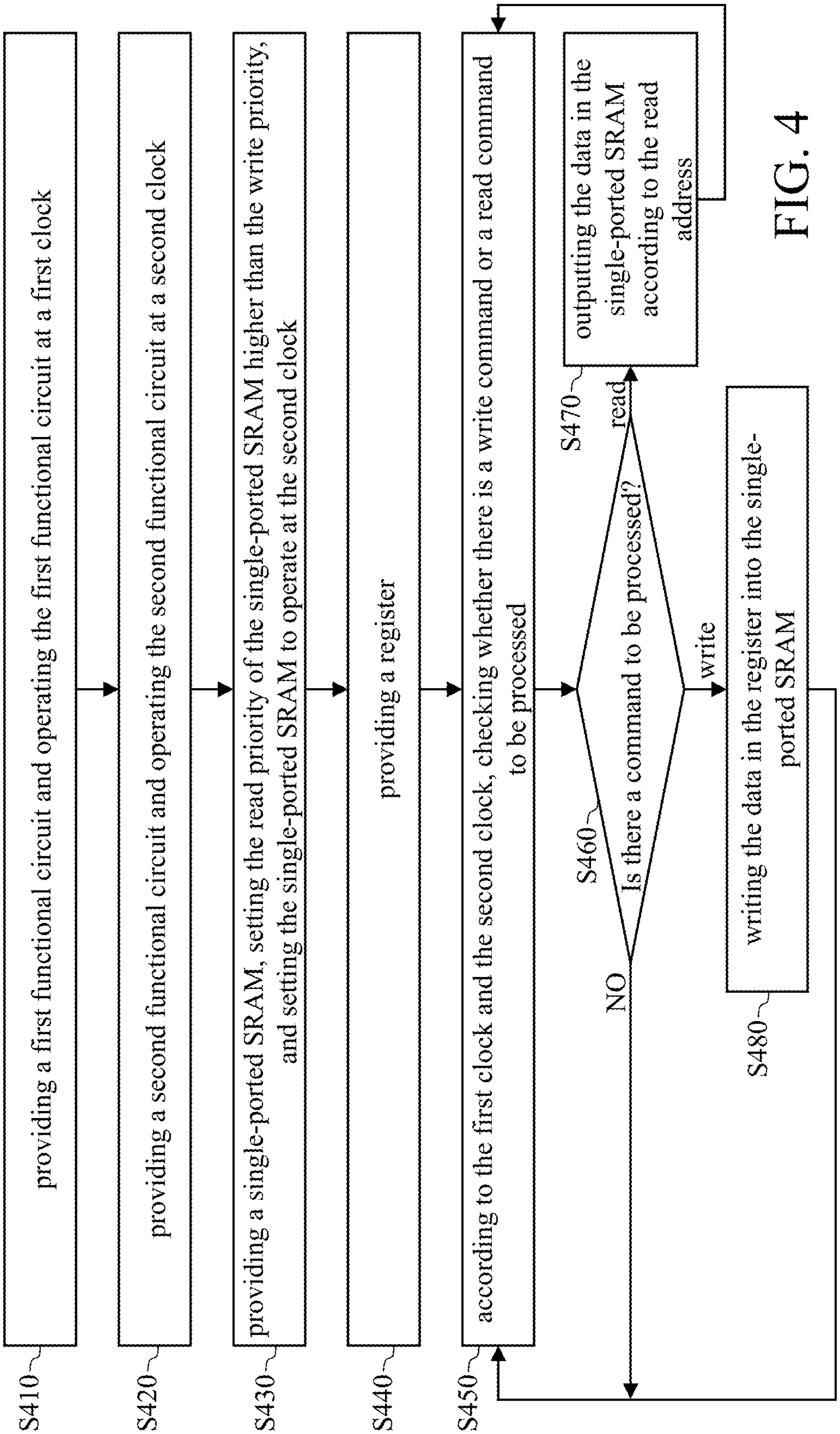
FIG. 4 is a flowchart of the method of operating the electronic device according to an embodiment of the present invention.

In addition to the aforementioned electronic device, the present invention correspondingly discloses a method of operating an electronic device. Part of the process of this method is executed by the aforementioned electronic device 200 or its equivalent device. FIG. 4 shows a flowchart of this method according to an embodiment. The flowchart includes the following steps.

Step S410: Providing the first functional circuit 210 and operating the first functional circuit 210 at the first clock CLK1.

Step S420: Providing the second functional circuit 220 and operating the second functional circuit 220 at the second clock CLK2. The frequency of the clock CLK2 is higher than the frequency of the clock CLK1.

Step S430: Providing a single-ported SRAM (234 or 246), setting the read priority of the single-ported SRAM higher than the write priority, and setting the single-ported SRAM to operate at the clock CLK2. People having ordinary skill in the art know how to adjust the read priority and write priority of the single-ported SRAM by designing the arbiter (235 or 245) of the single-ported SRAM, so further elaboration is omitted for brevity.

Step S440: Providing a register (232 or 242). The register is used to store the data (D1 or D2) to be written into the single-ported SRAM by the first functional circuit 210 or the second functional circuit 220.

Step S450: According to the first clock CLK1 and the second clock CLK2, checking whether there is a write command or a read command to be processed. Reference is made to the discussion of FIG. 3 for the details of this step.

Step S460: Determining whether there is a command to be processed. If there is no command to be processed, then the flow returns to the previous step to continue checking (step S450). If the command to be processed is a read command, then the flow proceeds to step S470. If the command to be processed is a write command, then the flow proceeds to step S480.

Step S470: Outputting the data (D1' or D2') in the single-ported SRAM (234 or 246) according to the read address in the read command.

Step S480: The arbiter (235 or 245) writes the data (D1 or D2) in the register (232 or 242) into the single-ported SRAM (234 or 246). Due to the fact that the single-ported SRAM has a higher read priority than a write priority, the arbiter will first ensure that there is no to-be-processed read command before performing a write operation.

Figure 5:
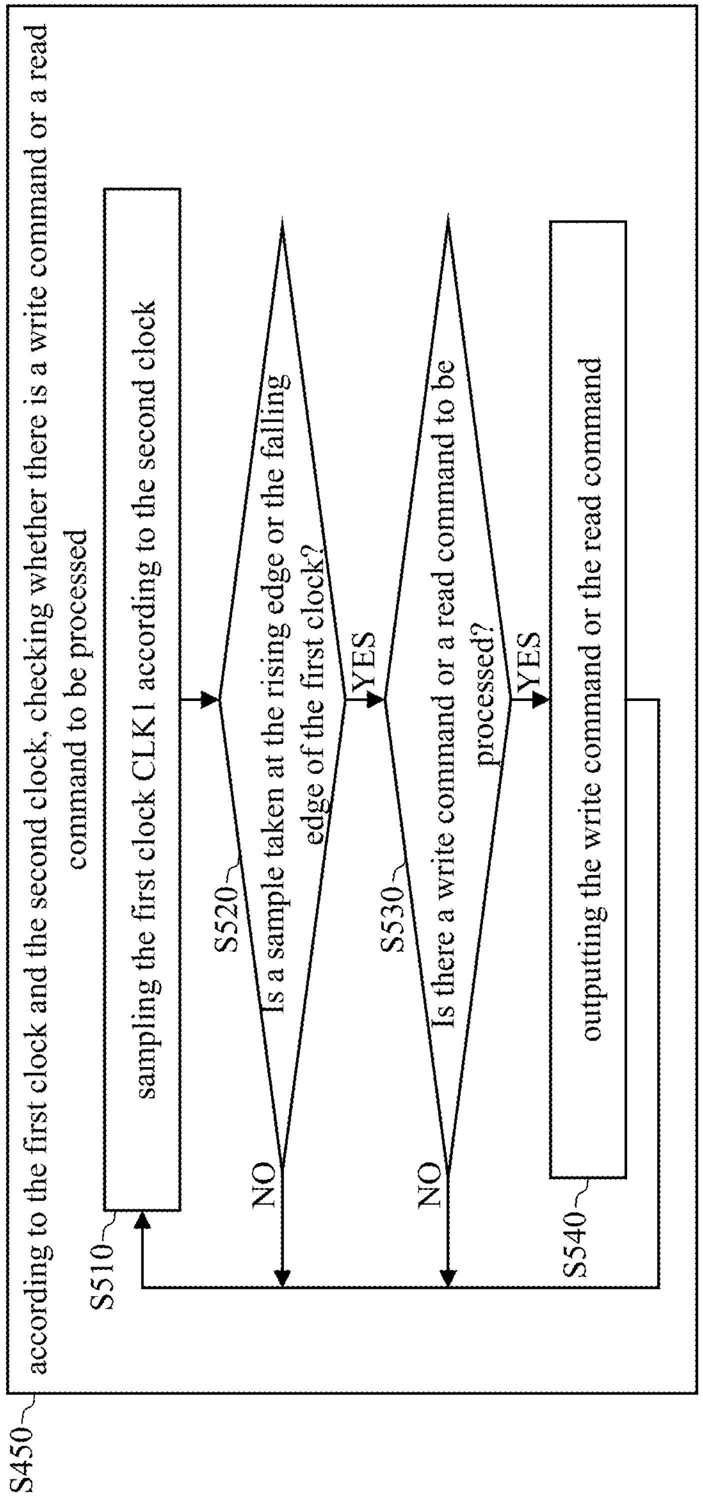
FIG. 5 is a detailed flowchart of step S450 in FIG. 4.

Reference is made to FIG. 5, which is a detailed flowchart of step S450 in FIG. 4. The flowchart includes the following steps. The process of FIG. 5 can be executed by the clock asynchronous processor 300.

Step S510: Sampling the first clock CLK1 according to the second clock CLK2.

Step S520: Determining whether a sample is taken at the rising edge or the falling edge of the first clock CLK1. If YES, then the flow proceeds to step S530; otherwise, the flow continues to sample the first clock CLK1 according to the second clock CLK2 (step S510).

Step S530: Determining whether there is a write command or a read command to be processed. If YES, then the flow proceeds to step S540; otherwise, the flow proceeds to step S510.

Step S540: Outputting the write command or the read command.

It can be seen from FIG. 5 that the clock asynchronous processor 300 checks whether there is a read command or a write command corresponding to the rising edge or the falling edge of the clock CLK1. If there is one, then the clock asynchronous processor 300 provides the read command or write command to the arbiter of the single-ported SRAM.

The single-ported SRAMs are intended to illustrate the invention by way of example and not to limit the scope of the claimed invention. People having ordinary skill in the art may apply the present invention to other types of memories in accordance with the foregoing discussions.

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Since a person having ordinary skill in the art can appreciate the implementation detail and the modification thereto of the present method invention through the disclosure of the device invention, repeated and redundant description is thus omitted. Note that the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An electronic device, comprising:

a first functional circuit operating at a first clock and generating a read command;

a second functional circuit operating at a second clock;

a memory coupled to the first functional circuit and the second functional circuit; and a clock asynchronous processor coupled to the first functional circuit and the memory and configured to check, according to the first clock and the second clock, whether the read command exists;

when the read command exists, the clock asynchronous processor provides the read command to the memory.

2. The electronic device of claim 1, wherein the second functional circuit generates a write command and a data, and the electronic device further comprises:

a register coupled to the second functional circuit and the memory and configured to store the data and operate at the second clock;

wherein the memory includes an arbiter, and the arbiter writes the data into the memory according to the write command.

3. The electronic device of claim 2, wherein when the read command and the write command exist simultaneously, the arbiter prioritizes processing the read command.

4. The electronic device of claim 1, wherein the memory operates at the second clock, and a frequency of the second clock is higher than a frequency of the first clock.

5. The electronic device of claim 4, wherein the clock asynchronous processor samples the first clock according to the second clock and checks whether the read command exists when sampling a rising edge or a falling edge of the first clock.

6. The electronic device of claim 1, wherein the memory is a single-ported static random access memory, and a frequency of the second clock is more than four times a frequency of the first clock.

7. The electronic device of claim 1, wherein the memory is a first memory, the clock asynchronous processor is a first clock asynchronous processor, the first functional circuit further generates a write command, and the electronic device further comprises:

a second memory coupled to the first functional circuit and the second functional circuit; and a second clock asynchronous processor coupled to the first functional circuit and the second memory and configured to check, according to the first clock and the second clock, whether the write command exists;

wherein when the write command exists, the second clock asynchronous processor provides the write command to the second memory.

8. The electronic device of claim 7, wherein the first functional circuit further generates a data, and the electronic device further comprises:

a register coupled to the first functional circuit and the second memory and configured to store the data and operate at the first clock;

wherein the second memory includes an arbiter, and the arbiter writes the data into the second memory according to the write command.

9. The electronic device of claim 8, wherein the read command is a first read command, the second functional circuit further generates a second read command, and when the second read command and the write command exist simultaneously, the arbiter prioritizes processing the second read command.

10. The electronic device of claim 7, wherein the first memory and the second memory operate at the second clock, and a frequency of the second clock is higher than a frequency of the first clock.

11. The electronic device of claim 10, wherein the second clock asynchronous processor samples the first clock according to the second clock and checks whether the write command exists when sampling a rising edge or a falling edge of the first clock.

12. The electronic device of claim 7, wherein the first memory and the second memory are each a single-ported static random access memory, and a frequency of the second clock is more than four times a frequency of the first clock.

13. An electronic device, comprising:

a first functional circuit operating at a first clock and generating a write command;

a second functional circuit operating at a second clock;

a memory coupled to the first functional circuit and the second functional circuit; and a clock asynchronous processor coupled to the first functional circuit and the memory and configured to check, according to the first clock and the second clock, whether the write command exists;

wherein when the write command exists, the clock asynchronous processor provides the write command to the memory.

14. The electronic device of claim 13, wherein the first functional circuit further generates a data, and the electronic device further comprises:

a register coupled to the first functional circuit and the memory and configured to store the data and operate at the first clock;

wherein the memory includes an arbiter, and the arbiter writes the data into the memory according to the write command.

15. The electronic device of claim 14, wherein the second functional circuit generates a read command, and when the read command and the write command exist simultaneously, the arbiter prioritizes processing the read command.

16. The electronic device of claim 13, wherein the memory operates at the second clock, and a frequency of the second clock is higher than a frequency of the first clock.

17. The electronic device of claim 16, wherein the clock asynchronous processor samples the first clock according to the second clock and checks whether the write command exists when sampling a rising edge or a falling edge of the first clock.

18. The electronic device of claim 13, wherein the memory is a single-ported static random access memory, and a frequency of the second clock is more than four times a frequency of the first clock.

19. A method of operating an electronic device, comprising:

providing a first functional circuit and operating the first functional circuit at a first clock;

providing a second functional circuit and operating the second functional circuit at a second clock;

providing a memory, wherein a read priority of the memory is higher than a write priority;

determining there is a read command or a write command to be processed according to the first clock and the second clock; and providing the read command or the write command to the memory when the read command or the write command is to be processed.

20. The method of claim 19, wherein a frequency of the second clock is higher than a frequency of the first clock, and the step of checking whether there is the read command or the write command to be processed according to the first clock and the second clock comprises:

sampling the first clock according to the second clock and checking whether the read command or the write command exists when a rising edge or a falling edge of the first clock is sampled.

* * * * *